3,444,255
PRODUCTION OF P-DIALKYLBENZENES
Karl-Heinz Hiller, Heidelberg (Rhine), Hubert Kindler, Ludwigshafen (Rhine), Heinrich Scholz, Heidelberg (Rhine), and Max Strohmeyer, Ludwigshafen (Rhine), Germany, assignors to Badische Anilin- & Soda-Fabrik, Aktiengesellschaft, Ludwigshafen (Rhine), Germany
No Drawing. Filed Feb. 6, 1967, Ser. No. 614,056
Claims priority, application Germany, Feb. 25, 1966, B 85,964
Int. Cl. C07c 15/04
U.S. Cl. 260—671                                      10 Claims

ABSTRACT OF THE DISCLOSURE

A process for the production of p-dialkylbenzenes by reacting alkylbenzenes or benzene with olefins in the presence of an aluminum chloride catalyst at a temperature above 60° C., the reaction being carried on for less than 3 minutes.

---

It is known that aromatic hydrocarbons can be alkylated with olefins in the presence of Friedel-Crafts catalysts. When alkylbenzenes are treated with olefins, o-, m- and p-dialkylbenzenes, together with polyalkyl derivatives, are obtained, the m-dialkylbenzenes being formed preferentially.

A number of processes has been described to influence the isomer ratio in favor of the p-constituent, for example modification of the metal halide used as catalyst, addition of an ether to the Friedel-Crafts catalyst or use of a polar solvent such as nitromethane or carbon disulfide. These processes are, however, unsatisfactory in practice as the increase in selectivity is accompanied by a mark reduction of the reaction velocity, new substances are introduced into the reaction product or catalyst components are used which render the process expensive.

Processes have also been described in which the alkylation is carried out at temperatures between −10° C. and +10° C. (Dutch patent application 6,406,787). Removal of the heat of reaction, however, presents difficulties in this process.

It is an object of the present invention to provide a process for the production of p-dialkylbenzenes in which high selectivity is achieved, the use of additives in the Friedel-Crafts catalyst or of polar solvents is unnecessary, undesired new components are not introduced into the reaction mixture and the removal of the heat of reaction presents no difficulties.

These and other objects are achieved in a process for the production of p-dialkylbenzenes from alkylbenzenes or benzene and olefins in the presence of an aluminum chloride catalyst at a temperature above 60° C. by carrying on the reaction for less than 3 minutes.

Surprisingly, the new process gives high yields of p-alkylbenzenes which were previously obtained only at very low temperatures or when polar solvents were employed. As compared with the prior processes the new process is characterized by very high reaction velocity and economic removal of the heat of reaction.

It is surprising that the new process should enable a satisfactory conversion to be achieved in the very short residence times having regard to the fact that much longer residence times were employed in the prior processes.

Benzene and alkylbenzenes with branched and straight alkyl chains are suitable for the new process. They usually contain 1 to 12 carbon atoms in the side chains, e.g. toluene, ethylbenzene, propylbenzene, tert.-butylbenzene, amylbenzenes, 2-ethylhexylbenzene, decylbenzenes and dodecylbenenes. Isopropylbenzene is particularly suitable. The alkylbenzenes can be employed in a pure form, but technical products may be used which can contain, for example, benzene, dialkylbenzenes and polyalkylbenzenes. In these products, the proportion of alkylbenzene should preferably exceed 50 mole percent or the ratio of alkyl groups to benzene groups present in the technical product should be between 0.6:1 and 1.4:1, preferably between 0.8:1 and 1.1:1. Technical products of this type are obtained, for example, by the interalkylation of dialkylbenzenes and/or polyalkylbenzenes with benzene in the presence of Friedel-Crafts catalysts. If benzene is employed as starting material this is first alkylated to mono-alklybenzene which is then further reacted to form the dialkylbenzene.

Olefins which are normally suitable for Friedel-Crafts alkylations are employed as olefins. These can contain either a straight or a branched carbon chain, the double bond being either terminal or situated in the middle of the chain. Olefins containing 2 to 12 carbon atoms such as ethylene, butylene, isobutylene, amylenes, hexenes, octenes, dodecenes and particularly propylene are normally employed.

Nor does the new process differ from the known alkylation reactions with regard to the aluminum chloride catalyst employed. Thus, 0.1 to 10% preferably 0.3 to 5%, and especially 0.5 to 2% by weight of aluminum chloride, referred to the benzene or alkylbenzene employed, is used. A small proportion of hydrogen chloride is preferably employed as cocatalyst, generally in a proportion of 0.01 to 1 mole per mole of aluminum chloride. Other compounds such as alkyl chlorides which form hydrogen chloride under the conditions of the reaction can be used place of hydrogen chloride.

The alkylation is carried out at temperatures above 60° C., usually between 60° C. and 200° C., preferably between 70 and 150° C. The reaction is generally carried out at atmospheric or superatmospheric pressure, for example up to 50 atm. The reaction should preferably be carried out under pressure when low-boiling starting materials are used, the pressure being determined by the vapor pressure of the mixture of starting materials at the reaction temperature.

The main feature of the process is that the reaction time (residence time) is less than 3 minutes, the residence time being between 30 seconds and 3 minutes at temperatures between 60 and 70° C., between 5 seconds and 2 minutes at 70 to 80° C., and less than 1 minute, preferably less than 10 seconds, at temperatures above 80° C.

The removal of the heat of reaction is readily achieved by using a suitable ratio of cooling surface to reaction volume. Surprisingly, however, it has been found that it is unnecessary to remove the heat of reaction during the reaction and that equally good results are obtained if the reaction is carried out under substantially adiabatic conditions, for example, in a tubular reactor.

The reaction is carried out by mixing the catalyst and starting materials and is discontinued after the reaction time specified for the particular reaction temperature.

The usual procedure is as follows:

The catalyst which on forming a complex with the alkylbenzene or benzene and olefin yields a liquid phase is first prepared by stirring solid aluminum chloride, hydrogen chloride, if employed, alkylbenzene or benzene and olefins so that the liquid catalyst phase is formed which can be readily metered. The catalyst phase is added to the mixture of starting materials, or a mixture of benzene or alkylbenzene and catalyst is added to the olefin. The addition of the individual reaction components or of the catalyst can take place over the whole duration of the reaction or, alternatively, the components can be mixed at the start. It is advantageous to avoid an excess of olefin, i.e. not more than 2 moles of olefin should be employed per mole of benzene and not more than 1 mole per mole of alkylbenzene. The ratio of the starting materials should preferably be such that ratio of "total benzene" to "total alkyl" in the reaction mixture is 1:1 to 1:1.6, preferably 1:1.05 to 1:1.3.

The reaction is preferably carried out in a tubular reactor to which, for example, alkylbenzene and catalyst and olefin are introduced at one end through mixing nozzles. If desired, a part of the olefin is added at this end and further quantities are introduced in the center portion. After the required reaction time or means residence time has elapsed, the reaction mixture is either decomposed immediately, i.e. the catalyst is destroyed, for example, by the addition of water, or the mixture is cooled rapidly to a temperature below 60° C. at which the activity of the catalyst is very much reduced.

After decomposition the p-dialkylbenzene is isolated from the reaction mixture in the usual way, for example by distillation. The m- and o-dialkylbenzenes and the polyalkylated products formed as by-products can be interalkylated in the usual way, for example by the addition by of benzene or alkylbenzene in the presence of a Friedel-Crafts catalyst.

The invention is further illustrated by, but not limited to, the following examples in which the percentages specified are by weight unless otherwise stated.

Example 1

400 l. of technical cumene is mixed with 4.5 l. of a liquid catalyst complex produced in conventional manner from cumene, aluminum chloride and hydrogen chloride in a vessel provided with a stirrer. The complex contains 1.8 kg. of aluminum chloride so that the concentration of aluminum chloride in the vessel is 0.5%. This mixture is pumped by means of a piston pump at the rate of 73 kg. per hour at 20 atm. into a reaction tube of diameter 6 mm. and length 3600 mm., this tube having an automatic constant pressure valve at the exit so that the pressure can be kept constant. The cumene containing catalyst is mixed with 8.3 kg./h. of liquid propylene in a mixing nozzle before entering the reaction tube. The propylene is drawn from a pressurized container under nitrogen and fed to the mixing nozzle through a flow controller. The total volume of the reaction tube is 127 ml. so that the residence time is 4.5 seconds. The temperature of the reaction mixture is measured immediately ahead of and after the reaction tube. In adiabatic operation the temperature rises from 28° C. at the inlet to 124° C. at the outlet from the reaction tube, i.e. the average temperature is 75° C. The reaction product after passing through the reaction tube and the constant pressure valve is decompressed to atmospheric pressure and passed into a vessel fitted with a stirrer and containing water. The aluminum chloride is washed out by stirring for a short time in this vessel. Any excess propylene present is blown off and the reaction product separated from the wash water in a separator. Analysis of the reaction product gives the following results:

| | Percent |
|---|---|
| Benzene | 1.1 |
| Cumene | 63.6 |
| m- and o-Diisopropylbenzene | 12.6 |
| p-Diisopropylenbenzene | 13.0 |
| 1,3,5-triisopropylbenzene | 4.0 |
| 1,2,4-triisopropylenbenzene | 4.4 |
| 1,2,4,5-tetraisopropylbenzene | 1.3 |

This composition corresponds to a proportion of 51% p-diisopropylbenzene (p-DIPB) in the diisopropylbenzene fraction. By carrying out the alkylation using the same molecular ratio of the starting materials in a flask fitted with a stirrer at a temperature of 75° C. for 1 hour, a mixture of the following composition is obtained:

| | Percent |
|---|---|
| Benzene | 8.5 |
| Cumene | 37.6 |
| m-DIPB | 29.3 |
| p-DIPB | 16.6 |
| 1,3,4-tri-IPB | 8.0 |

This composition corresponds to a proportion of 36% p-DIPB in the DIPB fraction.

Example 2

400 l. of cumene is introduced into a vessel fitted with a stirrer and heated to 75° C. 2.5 ml. of a liquid catalyst containing 1 g. of aluminum chloride and a small amount of hydrogen chloride is added. 0.43 mole of propylene per mole of cumene is added within 75 seconds. The reaction is interrupted by rapidly adding water which destroys the catalyst complex. The organic phase of the reaction product has the following composition:

| | Percent |
|---|---|
| Benzene | 1.2 |
| Cumene | 51.2 |
| m-DIPB and o-DIPB | 21.0 |
| p-DIPB | 18.2 |
| 1,3,5-tri-IPB | 6.6 |
| 1,2,4-tri-IPB | 1.8 |

This composition corresponds to a proportion of 46.5% p-DIPB in the IPB fraction.

We claim:
1. A process for the production of p-dialkylbenzenes by reacting an alkylbenzene or benzene with an olefin in the presence of an aluminum chloride catalyst at a temperature above 60° C. wherein the improvement comprises carrying on the reaction for a period of less than 3 minutes.

2. A process as claimed in claim 1 which comprises carrying out the reaction at a temperature between 60 and 70° C. and for a period between 30 seconds and 3 minutes.

3. A process as claimed in claim 1 which comprises carrying out the reaction at a temperature between 70 and 80° C. and for a period between 5 seconds and 2 minutes.

4. A process as claimed in claim 1 which comprises carrying out the reaction at a temperature above 80° C. and for a period of less than 1 minute.

5. A process for the production of p-diisopropylbenzene by reacting benzene or cumene with propylene in the presence of an aluminum chloride catalyst at a temperature of above 60° C. wherein the improvement comprises carrying on the reaction for a period of less than 3 minutes.

6. A process as claimed in claim 5 wherein the reaction is carried out at temperatures between 70° C. and 150° C. and for a period of less than 2 minutes.

7. In a process for the alkylation of a monoalkylbenzene or mixtures of at least 50 mole percent thereof in combination with at least one compound selected from the group consisting of benzene, dialkylbenzenes and polyalkylbenzenes by reaction with a monoolefin of 2 to 12 carbon atoms in the presence of an aluminum chloride catalyst, the improvement for increasing the amount of p-dialkylbenzene product which comprises carrying out the reaction at temperatures between 60° C. and 200° C. and for a period of less than 3 minutes.

8. A process as claimed in claim 7 wherein the reaction is carried out at temperatures above 80° C. and for a period of less than about 10 seconds.

9. A process as claimed in claim 7 wherein the reaction is carried out at a pressure of about 1 to 50 atmospheres.

10. A process as claimed in claim 7 wherein the olefin is propylene, the alkyl groups are isopropyl substituents in each instance and the reaction is carried out at temperatures above 80° C. for a period of less than 1 minute, thereby increasing the amount of p-diisopropylbenzene in the reaction product.

References Cited

UNITED STATES PATENTS

| 2,730,557 | 1/1956 | Max et al. | 260—671 |
| 2,740,819 | 4/1956 | Kirkland | 260—671 |

FOREIGN PATENTS 754,872  8/1956  Great Britain.

DELBERT E. GANTZ, *Primary Examiner.*

CURTIS R. DAVIS, *Assistant Examiner.*